United States Patent Office 3,313,169
Patented Apr. 11, 1967

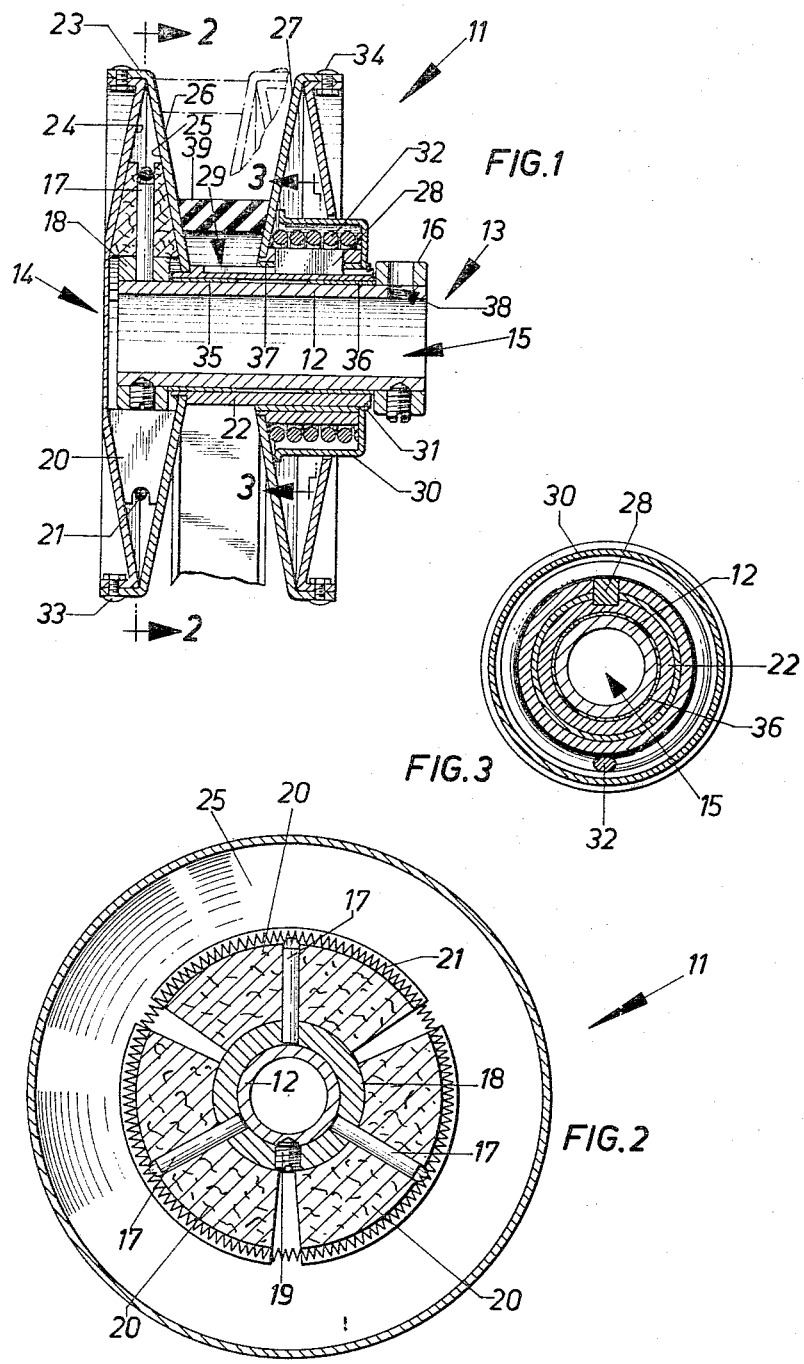

3,313,169
VARIABLE SPEED DRIVE
Andrew P. Peters, 74 Bobmar Road,
Westhill, Ontario, Canada
Filed Aug. 7, 1964, Ser. No. 388,081
4 Claims. (Cl. 74—230.17)

This invention relates to improvements in pulleys adapted for variable speed drives.

It is conventional practice in providing variable speed drives, to utilize a pulley together with a V-belt, the flanges of the pulley being variable as to spacing whereby the effective diameter driving the V-belt can be varied.

Various types of V-pulleys incorporating variable features have heretofore been proposed. However, a fault common with most such prior types of pulleys is the fact that during starting conditions the V-belt is subject to considerable wear due to the inertia of the system. Attempts to overcome this difficulty have led to the use of separate clutch mechanisms installed somewhere in the power train whereby the starting loads are absorbed gradually thereby to prevent undue wear on the V-belt. It will be understood however, that in many cases the limitations of space requirements prevent the use of additional clutch mechanisms and in such cases resort must be had to other means to prevent belt wear.

Accordingly, it is an object of the present invention to provide a variable pulley incorporating clutch means therein whereby starting loads can be absorbed by the clutch means, thereby to reduce belt wear.

It is a further object of the present invention to provide a variable pulley, whereby the effective driving diameter of the pulley can be varied remotely.

Another object of the present invention is to provide a variable pulley which incorporates clutch means without substantially increasing the size of the pulley assembly.

It is a still further object of the present invention to provide a variable pulley which can readily be disassembled for servicing.

Other objects and features of the invention will be apparent from the following detailed description and accompanying drawings in which like numerals refer to like parts throughout the various views.

In the drawings;

FIG. 1 is a mid vertical section through a preferred embodiment of the invention;

FIG. 2 is a section along the line 2—2 in FIG. 1; and

FIG. 3 is a section along the line 3—3 in FIG. 1.

Referring to FIG. 1, FIG. 2, and FIG. 3 a variable pulley is shown and indicated generally as 11. Pulley 11 comprises a driving shaft 12 having an inner end as at 13 and an outer end as at 14. It is intended that the pulley 11 be mounted on a power shaft and a bore as at 15 is provided therethrough whereby the pulley 11 can be mounted on the power shaft. It is preferable to provide a flange 16 about the inner end as at 13 in order that the pulley can suitably be secured to the power shaft.

A plurality of spokes 17 are secured to the outer end 14 of the driving shaft 12 by means of the collar 18. The collar 18 is removably secured to the driving shaft 12 by means of the set screw 19. A clutch element 20 is slidably secured on the spokes 17 and is adapted for movement in a radial direction. A garter spring 21 is secured about all clutch elements 20 thereby to resiliently constrain the elements inwardly toward the end 14 of driving shaft 12.

The tubular driven shaft 22 is rotatably supported, concentrically on the driving shaft 12 and has inner and outer ends substantially coincident with the inner and outer ends of the driving shaft 12.

A clutch housing 23 is rigidly secured to the outer end of the driven shaft 22 and extends about the clutch elements 20. As will be seen from the drawing the interior configuration of the clutch housing 23 is annular and tapered towards the periphery. The outer surface of the clutch element 20 is similar in configuration whereby the clutch elements 20 closely correspond thereto. Upon rotation of the driving shaft 12 the clutch elements 20 due to centrifugal action are forced outwardly into frictional contact with the inner surfaces as at 24 and 25 of the housing 23, thereby transmitting power to the driven shaft 22. The garter spring 21 serves as resilient means for constraining the outward movement of the clutch elements 20 until a predetermined peripheral speed has been obtained.

The clutch housing 23 also defines a stationary V-pulley flange 26 directed inwardly, the flange 26 thus being rigidly secured to the driven shaft 22.

A movable V-pulley flange 27 is slidably positioned on the driven shaft 22, rotation of the movable pulley flange 27 relative to shaft 22 being prevented by the key 28 slidable within the slot as at 29. A spring cover 30 is positioned over the inner end of driven shaft 22 and is held thereon by means of the spring clip 31.

A coil spring 32 is positioned over the driven shaft 22 within the spring cover 30 and biases the movable V-pulley flange 27 outwardly towards the stationary V-pulley flange 26. The position shown in FIG. 1 indicates the movable V-pulley flange 27 opened away from the stationary V-pulley flange 26 the maximum amount whereby the spring 32 is fully compressed.

Other features of the device include the securing screws 33 and 34 whereby the clutch housing 23 and the movable pulley 27 can be readily disassembled in order to provide access to the spring 32 and to the clutch elements 20. It is also preferable to provide the bearings 35 and 36 whereby the driven shaft 22 will be readily rotatable on the driving shaft 12, and to provide the bearing 37 within the movable V-pulley 27, whereby the movable pulley 27 will be readily slidable along the driven shaft 22.

In use the variable pulley 11 can be mounted on a suitable driving power shaft by means of the bore as at 15 and secured by means of the set screw position 38. Upon power being applied to the driving shaft 12 and rotation commencing centrifugal force tends to bias the clutch elements 20 outwardly. Upon reaching a predetermined peripheral speed the constraining force of the garter spring 21 is overcome and the elements 20 come in contact with the faces 24 and 25 of the clutch housing 23. Increased peripheral speed forces the elements 20 into greater frictional contact with the housing 23 whereby power is transmitted into the driven shaft 22. Thus upon starting loads being received into the driving shaft 12 a gradual build up of transmitted power is transferred into the belt 39. In this manner the power supplied to the belt 39 can be limited by the nature of the clutch elements 20 and the garter spring 21.

Upon full power being transmitted into the pulley 11 and thus to the belt 39 the distance between the pulley 11 and the remote pulley being driven by the belt 39 can be varied by any one of several well known means, this variation in distance between the pulleys altering the effective driving diameter of the pulley 11 whereby the belt 39 contacts the V-pulley flanges 26 and 27 in different radial positions. During the variation in the positions of the belt 39 the coil spring 32 maintains the correct relative distance between the V-pulley flanges 26 and 27 whereby the V-belt 39 is driving at all times. It should be understood that various means for providing the variation in distance between the pulley 11 and a driven remote pulley can be resorted to such methods being well known in the art.

It will be further understood that although specific embodiments of the invention have herein been described and illustrated, the invention also contemplates such variations in design as may fall within the scope of the appended claims.

The embodiments of the invention in which an exclusive property or privilege is claimed are defined as follows:

1. In a drive transmitting centrifugal clutch mechanism for use in operative association with a drive-shaft, a centrifugal clutch assembly fixed to said drive-shaft for rotation therewith, a clutch housing having an inner surface of annular configuration, said clutch housing enclosing said clutch assembly, and surrounding said drive-shaft, said clutch assembly embodying centrifugally movable elements and a set of radial spokes operatively fixed for rotation to said drive-shaft, said elements moving centrifugally on said spokes and being bearable progressively against the inner surface of said housing as the speed of said drive-shaft is increased, said housing idling freely on said drive-shaft until, and to the extent that, said centrifugally movable elements exert frictionally transmitted power to said housing due to said progressive bearing against said inner-surface, said elements having friction faces complementary to said inner clutch housing surface, said inner-surface of said housing being of progressively diminishing diametrical cross-section from axis to perimeter.

2. The elements according to claim 1 which, as viewed parallel with the rotary axis of said housing are seen to be of arcuate sectorial configuration.

3. The mechanism according to claim 1 which includes means for maintaining said clutch elements in a condition of axial contraction when dynamically unloaded.

4. The means according to claim 3 which embody a garter spring surrounding said frictional elements.

References Cited by the Examiner

UNITED STATES PATENTS

| | | | |
|---|---|---|---|
| 2,180,217 | 11/1939 | Thomas | 74—230.24 |
| 2,432,077 | 12/1947 | Segard | 192—105 X |
| 2,556,512 | 6/1951 | Ammon | 74—230.17 |
| 3,108,481 | 10/1963 | Westmont | 74—230.17 |

FOREIGN PATENTS 883,174    3/1943    France.

DAVID J. WILLIAMOWSKY, *Primary Examiner.*

MARK M. NEWMAN, L. H. GERIN,
                         *Assistant Examiners.*